United States Patent
Narayanan et al.

(10) Patent No.: US 9,565,098 B2
(45) Date of Patent: Feb. 7, 2017

(54) METHOD AND SYSTEM FOR IMPLEMENTING BORDER GATEWAY PROTOCOL ON NETWORK DEVICES

(71) Applicant: Arista Networks, Inc., Santa Clara, CA (US)

(72) Inventors: Siva Narayanan, San Jose, CA (US); Akshay Gattani, Mountain View, CA (US); Ian McCloghrie, Santa Clara, CA (US)

(73) Assignee: Arista Netwroks, Inc., Santa Clara, CA (US)

( * ) Notice: Subject to any disclaimer, the term of this patent is extended or adjusted under 35 U.S.C. 154(b) by 91 days.

(21) Appl. No.: 14/723,144

(22) Filed: May 27, 2015

(65) Prior Publication Data

US 2016/0352627 A1 Dec. 1, 2016

(51) Int. Cl.
*H04L 12/28* (2006.01)
*H04L 12/721* (2013.01)
*H04L 12/947* (2013.01)
*H04L 29/12* (2006.01)

(52) U.S. Cl.
CPC .............. *H04L 45/38* (2013.01); *H04L 49/25* (2013.01); *H04L 61/103* (2013.01); *H04L 61/2007* (2013.01)

(58) Field of Classification Search
CPC combination set(s) only.
See application file for complete search history.

(56) References Cited

U.S. PATENT DOCUMENTS

| | | | |
|---|---|---|---|
| 2006/0161673 A1* | 7/2006 | Moon | H04L 45/04 709/230 |
| 2014/0328343 A1* | 11/2014 | Kapadia | H04L 45/741 370/392 |
| 2016/0241457 A1* | 8/2016 | Semwal | H04L 45/02 |

OTHER PUBLICATIONS

Bates et al, Multiprotocol Extensions for BGP-4, RFC 4760, 12 pages, Jan. 2007.*

* cited by examiner

*Primary Examiner* — Frank Duong
(74) *Attorney, Agent, or Firm* — Osha Liang LLP

(57) ABSTRACT

A method for initializing the border gateway protocol (BGP) on network devices. The method includes predicting, by the network device, using a set of prediction heuristics, a first possible internet protocol version 6 (IPv6) address of a first peer network device. The method further includes sending, by the network device, a first neighbor discovery protocol (NDP) request for the first possible IPv6 address, and receiving, by the network device, from the first peer network device, in response to the NDP request, a first media access control (MAC) address. The method also includes establishing, after receiving the first MAC address, a BGP session with the first peer network device and exchanging route updates with the first peer network device, and processing a packet. The processing of the packet is delayed until the first MAC address is received.

20 Claims, 4 Drawing Sheets

METHOD AND SYSTEM FOR IMPLEMENTING BORDER GATEWAY PROTOCOL ON NETWORK DEVICES

BACKGROUND

Border network devices such as routers or multilayer switches are network devices that are used to manage the flow of data between different segments of a network. Border network devices may use the Border Gateway Protocol (BGP) to exchange reachability and routing information between the network segments.

SUMMARY

In general, in one aspect, the invention relates to a method for initializing the border gateway protocol (BGP) on network devices. The method includes predicting, by the network device, using a set of prediction heuristics, a first possible internet protocol version 6 (IPv6) address of a first peer network device. The method further includes sending, by the network device, a first neighbor discovery protocol (NDP) request for the first possible IPv6 address, and receiving, by the network device, from the first peer network device, in response to the NDP request, a first media access control (MAC) address. The method also includes establishing, after receiving the first MAC address, a BGP session with the first peer network device and exchanging route updates with the first peer network device, and processing a packet. The processing of the packet is delayed until the first MAC address is received.

In general, in one aspect, the invention relates to a network device that predicts, using a set of prediction heuristics, a first possible internet protocol version 6 (IPv6) address of a first peer network device. The network device also sends a first neighbor discovery protocol (NDP) request for the first possible IPv6 address, and receives, from the first peer network device, in response to the NDP request, a first media access control (MAC) address. The network device further establishes, after receiving the first MAC address, a BGP session with the first peer network device and exchanges route updates with the first peer network device, and processes a packet. The network device delays the processing of the packet until the first MAC address is received.

In general, in one aspect, the invention relates to a non-transitory computer readable medium including instructions, that enable a network device to predict, using a set of prediction heuristics, a first possible internet protocol version 6 (IPv6) address of a first peer network device. The instructions further enable the network device to send a first neighbor discovery protocol (NDP) request for the first possible IPv6 address, and to receive, from the first peer network device, in response to the NDP request, a first media access control (MAC) address. The instructions also enable the network device to establish, after receiving the first MAC address, a BGP session with the first peer network device and exchange route updates with the first peer network device; and to process a packet. The processing of the packet is delayed until the first MAC address is received.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to configuring a network device to perform routing of data packets in a network. More specifically, one or more embodiments of the invention include initializing the network device in preparation for activating the network device's routing functionality where the network device may include both Internet Protocol version 4 (IPv4) and Internet Protocol version 6 (IPv6) routes.

The following description describes some embodiments of the invention in which the network devices are routers. However, the invention is not limited to routers; rather embodiments of the invention may be extended to include other network devices (e.g. multi-layer switches).

Figure 1:
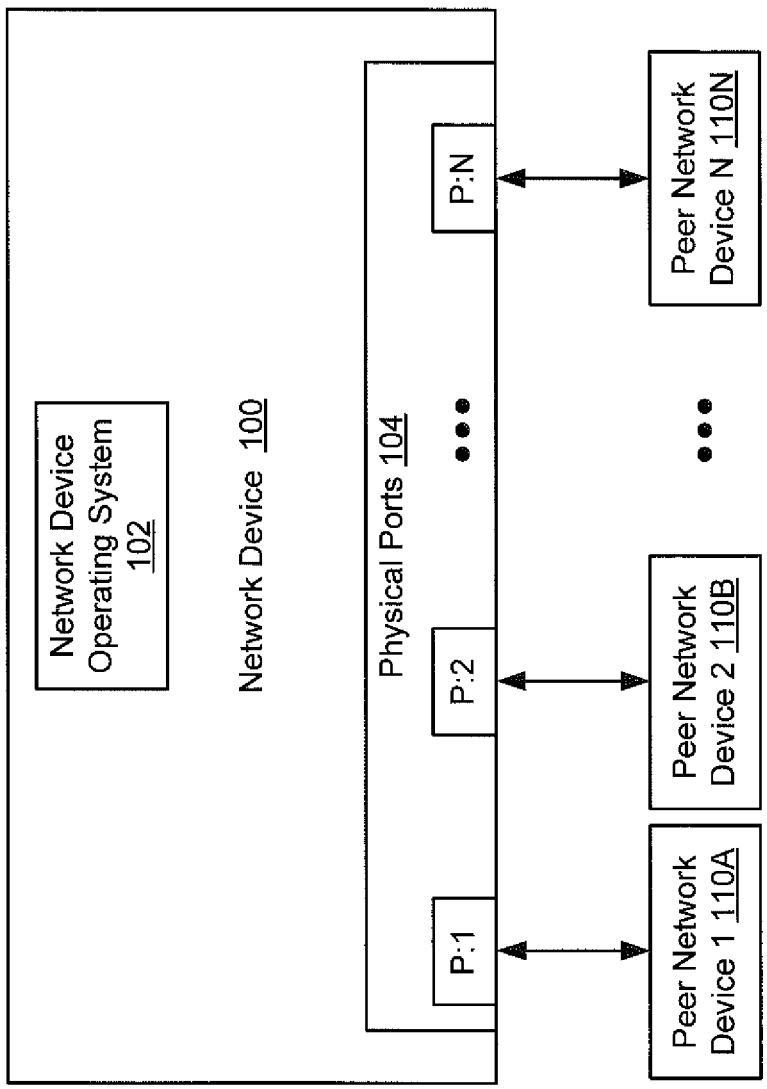
FIG. 1 shows a network device in accordance with one or more embodiments of the invention.

FIG. 1 shows a network device in accordance with one or more embodiments of the invention. In one embodiment of the invention, the network device (100) may be, for example, a router or a multilayer switch that includes executable instructions (stored on a non-transitory computer readable medium) and hardware (e.g., a processor, memory, persistent storage, etc.) configured to receive packets from network devices, process the packets, and send the packets to other network devices. In one embodiment of the invention, the network device (100) may include a network device operating system (OS) (102) and multiple physical ports (104). The physical ports may connect the network device (100) to peer network devices (110A-110N), such as, for example, routers and/or multi-layer switches. In one or more embodiments of the invention, the network device OS may be executed on a processor (not shown). The network device OS (102) is software that manages the hardware of the network device to provide functionality to the network device (e.g., functionality to implement methods shown in FIGS. 2-3).

In one or more embodiments of the invention, a network device may establish BGP sessions with peer network devices, i.e. it may connect to other BGP-capable network devices. A network device having an established BGP session with a peer network device may exchange route information with the peer network device. A network devices in accordance with one or more embodiments of the invention may exchange route information to obtain information about the surrounding network infrastructure and available routes, thus enabling the network device to make routing decisions when processing packets.

Before establishing BGP sessions with peer network devices, the network device may load information from a configuration database that specifies the peer network devices. In one embodiment of the invention, the configuration database may include manually entered reachability information for each configured peer network device. In one embodiment of the invention, the configuration database may include a set of IPv4 addresses each specifying a peer network device.

In one or more embodiments of the invention, the network devices may use IPv4 and/or IPv6 to define routes for directing packets from a source to a destination via a chain of network devices specified by a sequence of IPv4 and/or IPv6 addresses. Accordingly, a network device that is part of a route may be responsible for transferring a received packet to the next network device (also referred to as a "next hop") on the route, toward the destination of the packet.

IP addresses are logical addresses on the IP layer and may be independent from the network technology of the underlying link layer. For example, an IP route may span Ethernet-type and/or WiFi type link layer network segments. Accordingly, on the IP layer, a network device may identify another network device based on the other network device's IP address, regardless of the underlying link layer protocol used.

In order to send a packet to its next hop, the network device must know the IP address of the next hop as well as the media access control (MAC) address (or another link layer address) of the next hop. Once the sending network device has both the IP address and MAC address of the next hop, the sending network device may encapsulate the IP layer packet in a link layer frame (i.e., a packet that includes a sending network device MAC address, the next hop MAC address, and a payload that includes the IP layer packet, where the IP layer packet includes the sending network device IP address and the IP address of the ultimate destination of the packet). If a network device does not have that MAC address that corresponds to a next hop IP address, then the IP layer packet may not be deliverable and the sending network device may therefore be forced to drop the IP layer packet.

Network devices in accordance with one or more embodiments of the invention may therefore attempt to identify, for each configured peer network device, the MAC address corresponding to the IP address of the peer network device, before activating the network device's routing functionality. As previously described, a configuration database of a network device may identify each peer network device based on the peer network device's IPv4 address. In one or more embodiments of the invention, the network device may use the address resolution protocol (ARP) to determine the MAC address of a peer network device identified by the IPv4 address in the configuration database. The network device may broadcast an ARP message requesting an answer for the IPv4 address. All peer network devices in the network may receive the request, but only the peer network device with the IPv4 address matching the IPv4 address of the ARP request may respond by returning the MAC address of the peer network device. The MAC address affiliated with the IPv4 address of the peer network device may then be used by the network device to send packets to the peer network device.

As previously described, network devices in accordance with one or more embodiments of the invention may establish BGP sessions with peer network devices in preparation for activating the network device's routing functionality. In order to establish a BGP session with a peer network device, a communication channel between the network device and the peer network device is necessary. In one or more embodiments of the invention, the network device may use a transmission control protocol (TCP) session as a communication channel to negotiate the BGP session with the peer network device. The network device may address the peer network device using the peer network device's MAC address in order to establish the TCP session. A network device in accordance with an embodiment of the invention may therefore be required to resolve the MAC addresses of the peer network devices before establishing BGP sessions with the peer network devices and before activating the network device's routing functionality.

In one or more embodiments of the invention, network devices include functionality to route packets using protocols, other than or in addition, to IPv4. A network device implementing multiprotocol BGP (MBGP), for example, may route packets using both IPv4 addresses and IPv6 addresses. Network devices in accordance with one or more embodiments of the invention may therefore have an IPv4 address and an IPv6 address assigned. As previously described, the IPv4 address of a peer network device may be stored in the configuration database of a network device. In one or more embodiments of the invention, the configuration database may, however, not include the IPv6 address of a peer network device. Accordingly, the IPv6 address of a peer network device may be unknown to the network device.

In one or more embodiments of the invention, the network device may attempt to obtain IPv6 addresses and corresponding MAC addresses of the peer network devices identified by their IPv4 addresses in the configuration database before activating the routing functionality. In one embodiment of the invention, a trigger event may cause the network device to initiate this IPv6 address discovery process. A trigger event may be, for example, the detection of an active link at a physical port, indicating to the network device that a peer network device may be reachable at that physical port. Another trigger event may be, for example, the network device preparing for establishing a BGP session with a peer network device, after a TCP connection has been established with the peer network device, or receiving a request for establishing a BGP session from a peer network device after a TCP connection has been established by the peer network device with the network device. Other trigger events may be used to initiate the IPv6 address discovery protocol without departing from the invention.

In one or more embodiments of the invention, the IPv6 address discovery process may prevent the network device from declaring BGP convergence and from activating the network device's routing functionality until the IPv6 address discovery process is completed for all peer network devices configured in the network device's configuration database. In one or more embodiments of the invention, the IPv6 address discovery process may prevent a BGP session from being established with a particular peer network device until the IPv6 address discovery process is completed for that particular peer network device, thus preventing the network device from exchanging route updates with that particular peer network device, and from declaring BGP convergence and activating the network device's routing functionality. Accordingly, the network device may not be able to activate the network device's routing functionality until the IPv6 addresses discovery process is completed, thus preventing scenarios where the network device may be forced to drop packets destined to IPv6 addresses (because the MAC address corresponding to a given IPv6 address may not be known until after the IPv6 address discovery process has been completed), thus causing blackholing of IPv6 traffic flows.

Figure 2:
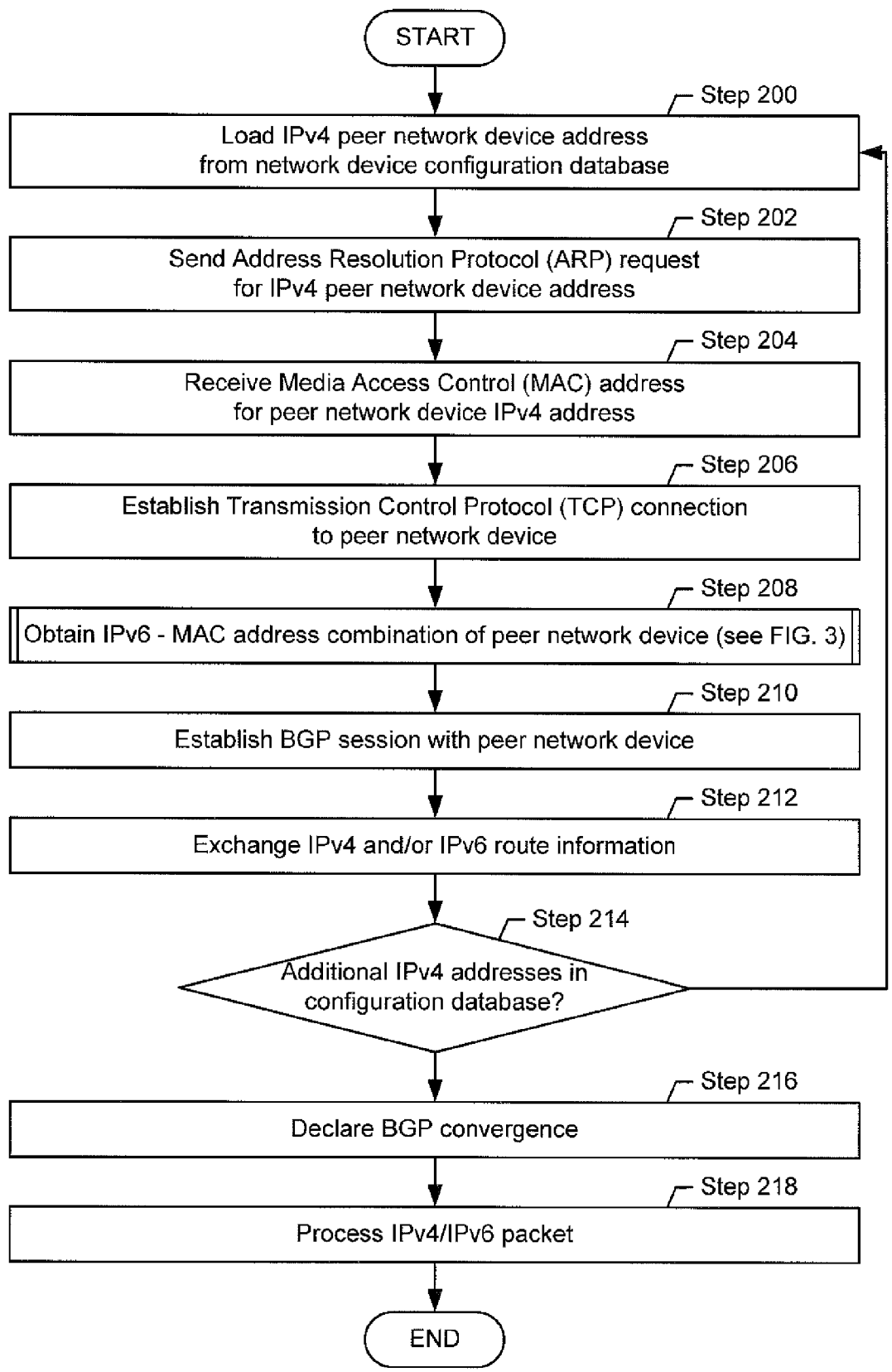
FIG. 2 shows a flowchart in accordance with one or more embodiments of the invention.
Figure 3:
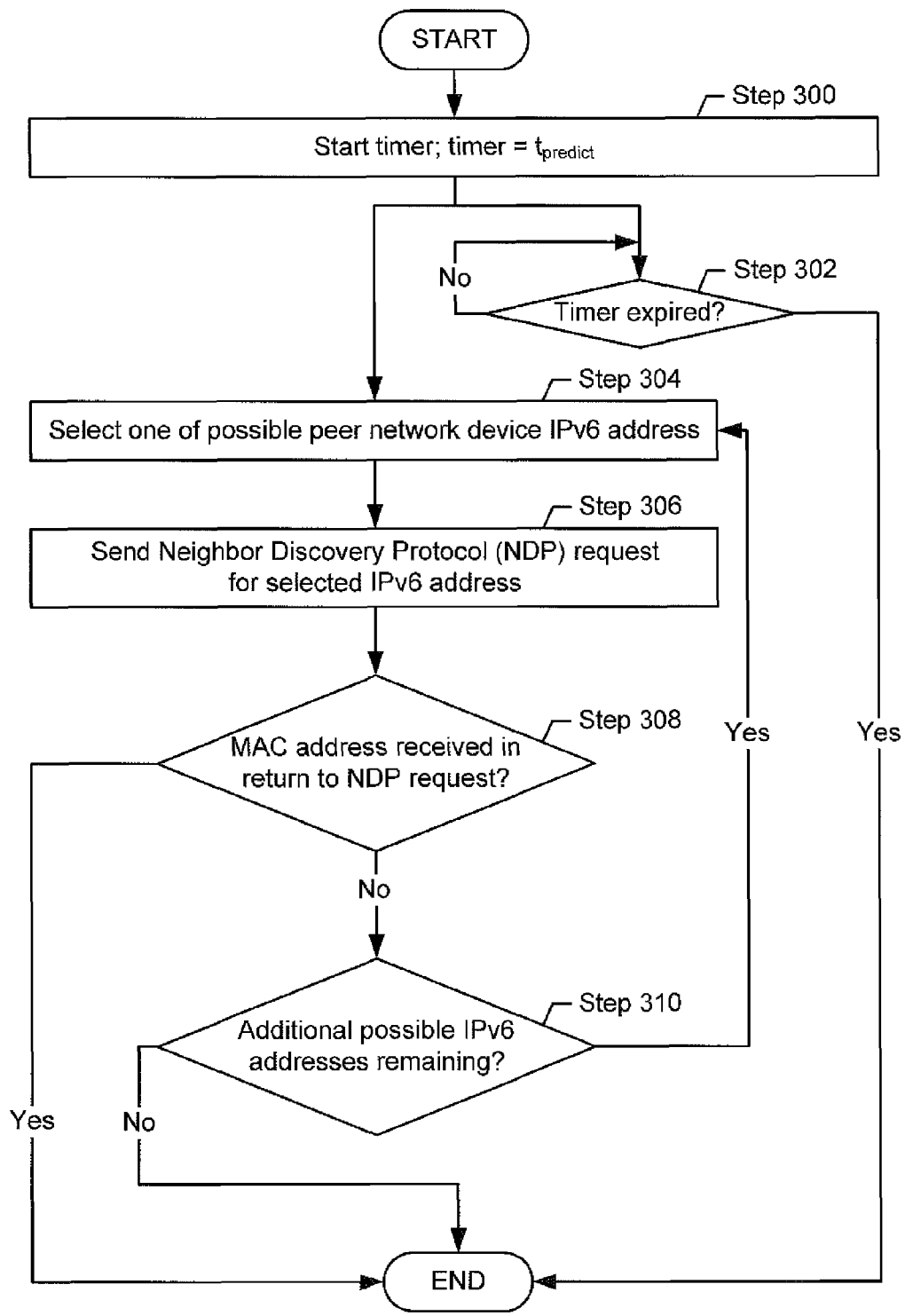
FIG. 3 shows a flowchart in accordance with one or more embodiments of the invention.

FIGS. 2 and 3 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-3 may be performed in parallel with any other steps shown in FIGS. 2-3 without departing from the invention.

FIG. 2 shows a method for initializing the border gateway protocol (BGP) on network devices. Turning to FIG. 2, in Step 200, the network device accesses a configuration database that specifies the peer network devices. In one embodiment of the invention, the configuration database includes an IPv4 address for each configured peer network device. The network device loads the IPv4 address of the peer network device with which it is attempting to establish a BGP session.

In Step 202, the network device sends an address resolution protocol (ARP) request for the IPv4 address loaded in Step 200 to the peer network devices. In Step 204, the peer network device with an IPv4 address matching the IPv4 address of the ARP request responds to the ARP request by returning the peer network device's media access control (MAC) address. In Step 206, the network device contacts the peer network device using the peer network device's MAC address to establish a transmission control protocol (TCP) session with the peer network device. The TCP session establishes a basic communication channel that the network device may use to establish a BGP session with the peer network device.

In Step 208, the network device determines the IPv6 address and the corresponding MAC address of the peer network device. In one or more embodiments of the invention, the method may only proceed to Step 210 if Step 208 has been completed. The details of Step 208 are described in FIG. 3.

In Step 210, the network device establishes a BGP session with the peer network device, i.e. it initiates a link to the peer network device and negotiates the BGP session parameters by which the BGP session will be conducted. In Step 212, the network device exchanges IPv4 and/or IPv6 route updates with the peer network device. In Step 214, a determination is made about whether additional IPv4 addresses for additional peer network devices are configured in the configuration database. If there are additional peer network devices, Steps 200-212 are repeated for the additional peer network devices. In one or more embodiments of the invention, Steps 200-212 may be executed in parallel for multiple peer network devices configured in the network device's configuration database. If a determination is made that there are no additional IPv4 addresses for additional peer network devices in the configuration database, the method may proceed to Step 216. In Step 216, the network device declares BGP convergence and writes a set of IPv4 and IPv6 routes and the MAC addresses of the corresponding next hops to the forwarding information base (FIB) of the network device. Subsequently, the network device may activate its routing functionality. In one or more embodiments of the invention, the method may only proceed to Step 216 if the IPv6 address discovery process has been completed for all peer network devices configured in the network device's configuration database.

In Step 218, the network device processes IPv4 and/or IPv6 packets. Processing a packet may include multiple steps. The network device may first receive a packet and extract the destination IP address from the packet header. The network device may use the destination IP address to select an appropriate route from the routes stored in the FIB. The selected route entry in the FIB may specify a next hop IP address and may include the MAC address of the next hop. Subsequently, the network device may encapsulate the packet in a link layer frame and send the frame including the packet to the next hop network device using the MAC address of the next hop network device.

FIG. 3 shows a method for determining, by the network device, the IPv6 address and the MAC address of the peer network device specified by the IPv4 address in the configuration database in Step 200 of FIG. 2. The process described in FIG. 3 may be performed by the network device, separately for each configured peer network device. In one or more embodiments of the invention, the IPv6 address discovery process may include an attempt, by the network device, to predict the IPv6 address of the peer network device, followed by an attempt to confirm that the predicted IPv6 address is correct. The network device may confirm that a predicted IPv6 address is correct by requesting and receiving a MAC address for the IPv6 address to be confirmed. The IPv6 address discovery process may make another, different IPv6 address prediction if the previously predicted IPv6 address did not match the IPv6 address of the peer network device. The IPv6 address discovery process may repeat these steps until the correct IPv6 address of the peer network device is determined. In one embodiment of the invention, the IPv6 address discovery process may use a timer to limit the time available for IPv6 address prediction. The IPv6 discovery process may be terminated when the timer expires, even if the IPv6 address has not been resolved, thus enabling a network device to complete the network device's initialization in situations where repeated attempts to predict the IPv6 address of a peer network device have been unsuccessful. If the network device receives a packet that is directed to an IPv6 address where the corresponding MAC address has not been resolved during network device initialization, the network device may resolve the MAC address when processing the packet. Although this may result in the packet being dropped, the network device may obtain the missing MAC address, thus enabling the network device to process subsequently received packets directed to the IPv6 address. A sustained high rate of IPv6 packets received while the MAC address is being resolved may lead to a high number of IPv6 packet drops.

Turning to FIG. 3, in Step 300, the network device initializes and starts a timer. The timer is initialized to a timeout value $t_{predict}$. The timer serves as a control mechanism to allow termination of the method described in FIG. 3, after the maximum time available for predicting a peer network device's IPv6 address, $t_{predict}$, has passed. Typical values selected for $t_{predict}$ may be in a range between 0 and 10 seconds. The timer may further be reset to $t_{predict}$, once or repeatedly, for example, to provide additional time for exploring the IPv6 address space. In Step 302, a determination is made about whether the timer has expired. If the timer has expired, the execution of Steps 304-310 may be terminated. If a determination is made that the timer has not expired, the execution of Steps 304-310 may continue.

In Step 304, the network device attempts to predict the unknown IPv6 address of the peer network device specified by the IPv4 address loaded from the configuration database in Step 200 of FIG. 2. In one embodiment of the invention, the IPv6 address discovery process may use a systematic approach to predicting the IPv6 address of a peer network device. The prediction of the peer network device's IPv6 address may be guided by, for example, the network device's IPv6 address and the prefix of the subnet of which the network device and the peer network device are members. If the IPv6 prefix of the subnet connecting the network device with the peer network device is /127, only one bit of the 128-bit IPv6 address is available to address the network device and the peer network device. Such a /127 subnet therefore offers only two valid IPv6 addresses to be assigned to the network device and the peer network device. Accordingly, a network device in accordance with an embodiment of the invention may predict that the IPv6 address of the peer network device is the IPv6 address not used by the network device itself. For a subnet with any other (i.e. non-/127) prefix, more than a single possible IPv6 address may exist for a peer network device. A /126 subnet, for example, provides four IPv6 addresses. With one IPv6 address being assigned to the network device, three possible IPv6 addresses may remain as possible IPv6 addresses of the peer network device. Accordingly, the network device may predict and test three IPv6 addresses in order to determine the IPv6 address assigned to the peer network device.

In one or more embodiments of the invention, a systematic approach to predicting the IPv6 address of a peer network device may result in correct IPv6 address predictions even in large subnets because network administrators may have assigned IPv6 addresses in a systematic manner. For example, a network administrator may have assigned consecutive IPv6 addresses to a group of network devices. Accordingly, the network device may predict that the IPv6 address of a peer network device is an IPv6 address adjacent to the IPv6 address of the network device itself. A network device having an IPv6 address where the last 16 bits are "FA35" (hexadecimal representation), for example, may predict that the IPv6 address of the peer network device ends in "FA34" or "FA36". The network device may further predict additional IPv6 addresses near the IPv6 address of the network device. The network device may, for example, predict the IPv6 addresses ending in "FA33" and "FA37", and in subsequent prediction cycles the network device may further consider the IPv6 addresses ending in "FA32" and "FA38", etc. Accordingly, an initial prediction may be an IPv6 address immediately adjacent to the IPv6 address of the network device, whereas later predictions may be increasingly distant from the IPv6 address of the network device.

In Step 306, the network device uses the neighbor discovery protocol (NDP) to send a neighbor solicitation message requesting a MAC address for the predicted IPv6 address. NDP is a protocol for IPv6, described by the IETF document RFC 4861, designed to discover the presence of peer network devices and to determine peer network devices' link-layer addresses. RFC 4861 is hereby incorporated by reference in its entirety. In order to resolve the MAC address corresponding to the predicted IPv6 address, the network device sends a neighbor solicitation message. The neighbor solicitation message for the predicted IPv6 address may be sent to an IPv6 solicited node multicast address All network devices that have been assigned this multicast address may receive the neighbor solicitation message. However, only the peer network device whose IPv6 address matches the IPv6 address specified in the neighbor solicitation message responds by sending its MAC address in a neighbor advertisement message.

Continuing with the discussion of FIG. 3, in Step 308, a determination is made about whether a MAC address was received in return to the NDP request (e.g., a neighbor solicitation message) sent in Step 306. If a MAC address was received, the method determines that the IPv6 address used in the NDP request sent in Step 306 is the IPv6 address of the peer network device, and that the MAC address received is the MAC address of the peer network device. Accordingly, the execution of Steps 304-310 may be terminated. In one embodiment of the invention, a received MAC address is only considered if the MAC address reply is received over the same logical interface over which the MAC address reply corresponding to the IPv4 address is received. If a determination is made that a MAC address was not received, thus indicating that the predicted IPv6 address is incorrect, the method may proceed to Step 310.

In Step 310, a determination is made about whether additional possible IPv6 addresses that may match the actual IPv6 address of the peer network device remain to be tested. A /127 subnet, for example may include only one possible IPv6 address for the peer network device, a /126 subnet may include three possible IPv6 addresses, a /125 subnet may include seven possible IPv6 addresses, etc. If no additional possible IPv6 addresses remain, the execution of Steps 304-310 may be terminated. If a determination is made that additional possible IPv6 addresses to be tested remain, the method may return to Step 304.

Figure 4:
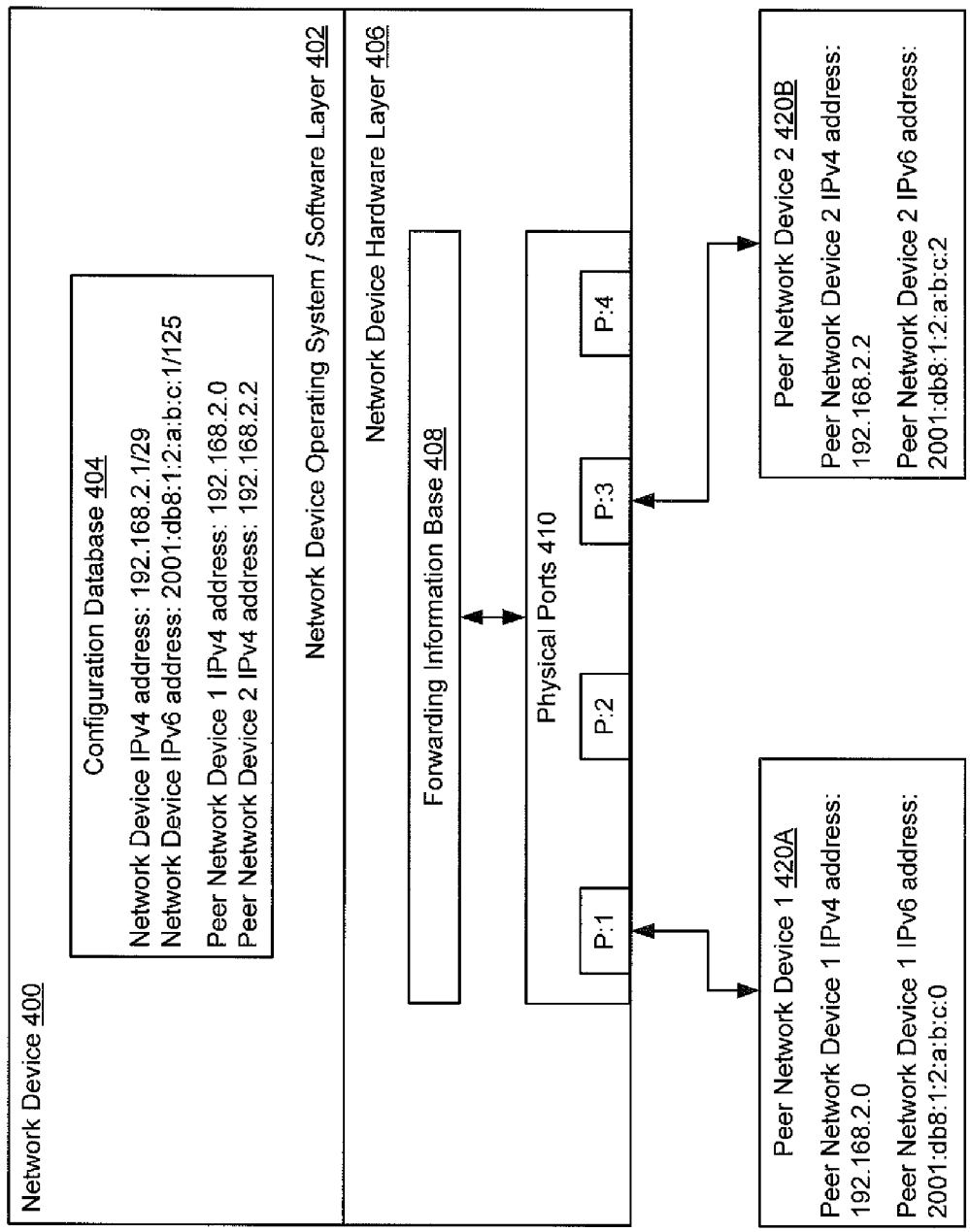
FIG. 4 shows a network device in accordance with one or more embodiments of the invention.

FIG. 4 shows a scenario where a network device (400) is initializing, in accordance with one or more embodiments of the invention. The network device is configured to attempt to peer with two peer network devices (420A and 420B), connected via physical ports P:1 and P:3, respectively. All network devices (400, 420A, and 420B) have been assigned IPv4 and IPv6 addresses. The network device configuration database (404) of the network device (400) has been programmed to include the IPv4 addresses of the peer network devices. All three network devices are configured to exchange IPv4 and IPv6 route updates using BGP, and to process packets using IPv4 and IPv6 protocols.

The use case scenario described below is intended to provide an example of the method for implementing BGP on network devices, described in FIGS. 2-3. The use case scenario is based on the sample network shown in FIG. 4 and is for illustrative purposes only. The method described by FIGS. 2-3 is not limited to the network topology shown in FIG. 4, but rather is universally applicable to a wide range of networks of different topology, complexity and size.

Consider a scenario in which the network device (400), implementing the method shown in FIGS. 2 and 3, initializes after power on. The network device executes the method shown in FIG. 2. The network device accesses the configuration database (404), determines that its IPv4 and IPv6 addresses are 192.168.2.1 and 2001:db8:1:2:a:b:c:1, respectively, and that an IPv4 /29 subnet and an IPv6 /125 subnet are configured. In Step 200, the network device loads the IPv4 address (192.168.2.0) of peer network device 1 (420A)

from the configuration database. In Step 202, the network device broadcasts an address resolution protocol (ARP) request for IPv4 address 192.168.2.0. Peer network device 1 (420A), connected via physical port P:1, receives and processes the request. Peer network device 1 (420A) detects that the IPv4 address included in the ARP request matches the IPv4 address of peer network device 1 (420A) and responds by returning the media access control (MAC) address of peer network device 1 (420A) to the network device (400). In Step 204, the network device (400) receives the MAC address of peer network device 1 (420A).

In Step 206, the network device negotiates a transmission control protocol (TCP) connection with peer network device 1. Establishing a TCP connection with peer network device 1 in preparation for establishing a BGP session with peer network device 1 is a trigger that initiates the IPv6—MAC address resolution process of Step 208, as described below.

In Step 300, the network device initializes and starts the timer that limits the time available for predicting peer network device 1's IPv6 address. In the example, the timer is initialized to a timeout value of 5 seconds. In Step 302, the timer has not expired, accordingly the execution of the method described in FIG. 3 continues. In Step 304, the network device makes a prediction for the IPv6 address of peer network device 1. The first prediction is an IPv6 address immediately adjacent to the IPv6 address of the network device. Here, the network device predicts that the IPv6 address of peer network device 1 is 2001:db8:1:2:a:b:c:2.

In Step 306, the network device sends a neighbor solicitation message requesting a MAC address for the IPv6 address 2001:db8:1:2:a:b:c:2. Peer network device 1 is connected to the network device via port P:1, thus the network device sends the neighbor solicitation message via physical port P:1. Peer network device 1 receives the message and processes it, but does not respond because the IPv6 address included in the neighbor solicitation message does not match the IPv6 address of peer network device 1. Accordingly, the network device does not receive a reply from peer network device 1 in Step 308. In Step 310, the network device determines that it may be able to make additional predictions and returns to Step 304.

In Step 304, the network device predicts that the IPv6 address of peer network device 1 is the other IPv6 address immediately adjacent to the IPv6 address of the network device. Accordingly, the network device predicts that the IPv6 address of peer network device 1 is 2001:db8:1:2:a:b:c:0. In Step 306 the network device sends a neighbor solicitation message request for the IPv 6 address 2001:db8:1:2:a:b:c:0. Peer network device 1 receives the message and processes it. Peer network device 1 detects that the IPv6 address included in the neighbor solicitation message matches the IPv6 address of peer network device 1 and responds by returning the MAC address of peer network device 1 to the network device. In Step 308, the network device receives the MAC address from peer network device 1. The received MAC address confirms that the IPv6 address, 2001:db8:1:2:a:b:c:0, is the IPv6 address of the peer network device. Accordingly, the method has successfully resolved the IPv6—MAC address pair of peer network device 1, and proceeds to Step 210 in FIG. 2.

Returning to FIG. 2, in Step 210, the network device establishes a BGP session with peer network device 1. In Step 212, the network device and peer network device 1 exchange IPv4 and IPv6 route updates. In Step 214, the network device determines that there is an IPv4 address (192.168.2.2) for peer network device 2 in the configuration data base. Accordingly, Steps 200-212 are repeated for peer network device 2. After steps 200-212 have been performed for peer network device 2, the network device writes a set of IPv4 and IPv6 routes that include the routes obtained from the peer network devices and the MAC addresses of the corresponding next hops to the forwarding information base (408) in the hardware layer (406). After the completion of these steps, the network device is ready to activate the routing services and accordingly proceeds to Step 216 where BGP convergence is declared. In Step 218, the network device processes incoming packets by routing the packets.

Embodiments of the invention may enable a network device to resolve IPv6—MAC address pairs of peer network devices during an initialization phase. A network device according to one or more embodiments of the invention may determine the IPv6—MAC address pairs of peer network devices proactively before activating the network device's routing functionality, rather than resolving the MAC address when a packet is directed to an IPv6 address with an unknown MAC address. Accordingly, the network device may be able to immediately process the packet directed to an IPv6 address, rather than dropping IPv6 packets while attempting to determine the unresolved MAC addresses corresponding to the IPv6 addresses.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for initializing the border gateway protocol (BGP) on network devices, the method comprising:
    predicting, by the network device, using a set of prediction heuristics, a first possible internet protocol version 6 (IPv6) address of a first peer network device;
    sending, by the network device, a first neighbor discovery protocol (NDP) request for the first possible IPv6 address;
    receiving, by the network device, from the first peer network device, in response to the NDP request, a first media access control (MAC) address;
    establishing, after receiving the first MAC address, a BGP session with the first peer network device and exchanging route updates with the first peer network device; and
    processing a packet, wherein processing the packet is delayed until the first MAC address is received.

2. The method of claim 1 further comprising:
    predicting, by the network device, using the set of prediction heuristics, a second possible IPv6 address of a second peer network device;
    sending, by the network device, a second NDP request for the second possible IPv6 address, wherein the network device does not receive a response to the second NDP request;
    predicting, by the network device, using the set of prediction heuristics, a third possible IPv6 address of the second peer network device;
    sending, by the network device, a third NDP request for the third possible IPv6 address;
    receiving, by the network device, from the second peer network device, in response to the third NDP request, a second MAC address;

establishing, after receiving the second MAC address, a second BGP session with the second peer network device and exchanging route updates with the second peer network device; and processing the packet, wherein processing the packet is further delayed until the second MAC address is received.

3. The method of claim 1 further comprising:

predicting, by the network device, using the set of prediction heuristics, a second possible IPv6 address of a second peer network device;

sending, by the network device, a second NDP request for the second possible IPv6 address;

receiving, by the network device, from the second peer network device, in response to the second NDP request, a second MAC address;

establishing, after receiving the second MAC address, a second BGP session with the second peer network device and exchanging route updates with the second peer network device;

processing the packet, wherein processing the packet is further delayed until the second MAC address is received.

4. The method of claim 1, wherein predicting, by the network device, using the set of prediction heuristics, the first possible IPv6 address of the first peer network device is performed after a trigger event occurs.

5. The method of claim 4, wherein the trigger event comprises an attempt to establish the BGP session with the first peer network device.

6. The method of claim 4, wherein the trigger event comprises detection of an active link on a physical port of the network device.

7. The method of claim 1, wherein processing the packet comprises:

determining, based on an IPv6 route selected for the packet, that the first peer network device is a next hop of the packet; and sending the packet to the first peer network device using the first MAC address of the first peer network device.

8. The method of claim 1, wherein the set of prediction heuristics for predicting a possible IPv6 address comprises:

determining a subnet configuration; and selecting IPv6 addresses based on the subnet configuration.

9. The method of claim 8, wherein the subnet configuration specifies a /127 subnet.

10. The method of claim 1, wherein the set of prediction heuristics for predicting a possible IPv6 address comprises:

selecting a first IPv6 address that is immediately adjacent to the IPv6 address of the network device for the first prediction;

wherein a subnet is not a /127 subnet.

11. The method of claim 10, further comprising:

in a subsequent prediction attempt, selecting a second IPv6 address that is immediately adjacent to the IPv6 address of the network device.

12. The method of claim 11 further comprising:

in additional subsequent prediction attempts, selecting IPv6 addresses that are increasingly remote from the IPv6 address of the network device.

13. A network device that:

predicts, using a set of prediction heuristics, a first possible internet protocol version 6 (IPv6) address of a first peer network device;

sends a first neighbor discovery protocol (NDP) request for the first possible IPv6 address;

receives, from the first peer network device, in response to the NDP request, a first media access control (MAC) address;

establishes, after receiving the first MAC address, a BGP session with the first peer network device and exchanges route updates with the first peer network device; and processes a packet, wherein processing the packet is delayed until the first MAC address is received.

14. The network device of claim 13, wherein the network device further:

predicts, using the set of prediction heuristics, a second possible IPv6 address of a second peer network device;

sends a second NDP request for the second possible IPv6 address, wherein the network device does not receive a response to the second NDP request;

predicts, using the set of prediction heuristics, a third possible IPv6 address of the second peer network device;

sends a third NDP request for the third possible IPv6 address;

receives, from the second peer network device, in response to the third NDP request, a second MAC address;

establishes, after receiving the second MAC address, a second BGP session with the second peer network device and exchanges route updates with the second peer network device; and processes the packet, wherein processing the packet is further delayed until the second MAC address is received.

15. The network device of claim 13, wherein the set of prediction heuristics for predicting a possible IPv6 address comprises:

determining a subnet configuration; and selecting IPv6 addresses based on the subnet configuration.

16. The network device of claim 13, wherein the network device is a router.

17. The network device of claim 13, wherein the network device is a multilayer switch.

18. A non-transitory computer readable medium comprising instructions, that enable a network device to:

predict, using a set of prediction heuristics, a first possible internet protocol version 6 (IPv6) address of a first peer network device;

send a first neighbor discovery protocol (NDP) request for the first possible IPv6 address;

receive, from the first peer network device, in response to the NDP request, a first media access control (MAC) address;

establish, after receiving the first MAC address, a BGP session with the first peer network device and exchange route updates with the first peer network device; and process a packet, wherein processing the packet is delayed until the first MAC address is received.

19. The non-transitory computer readable medium of claim 18, further comprising instructions, that enable the network device to:

predict, using the set of prediction heuristics, a second possible IPv6 address of a second peer network device;

send a second NDP request for the second possible IPv6 address, wherein the network device does not receive a response to the second NDP request;

predict, using the set of prediction heuristics, a third possible IPv6 address of the second peer network device;

send a third NDP request for the third possible IPv6 address;

receive, from the second peer network device, in response to the third NDP request, a second MAC address;

establish, after receiving the second MAC address, a second BGP session with the second peer network device and exchange route updates with the second peer network device; and process the packet, wherein processing the packet is further delayed until the second MAC address is received.

20. The non-transitory computer readable medium of claim 18, wherein the set of prediction heuristics for predicting a possible IPv6 address comprises instructions that enable the network device to:

determine a subnet configuration; and select IPv6 addresses based on the subnet configuration.

* * * * *